United States Patent
Mullen et al.

(10) Patent No.: US 8,485,446 B1
(45) Date of Patent: Jul. 16, 2013

(54) SHIELDED MAGNETIC STRIPE FOR MAGNETIC CARDS AND DEVICES

(75) Inventors: Jeffrey D. Mullen, Pittsburgh, PA (US); James H. Workley, Imperial, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 13/433,182

(22) Filed: Mar. 28, 2012

Related U.S. Application Data (60) Provisional application No. 61/468,311, filed on Mar. 28, 2011.

(51) Int. Cl.
G06K 19/02 (2006.01)
G06K 5/00 (2006.01)
G06K 7/08 (2006.01)
G06K 19/00 (2006.01)
G06K 19/06 (2006.01)
G06Q 40/00 (2012.01)
G07D 11/00 (2006.01)
G07F 19/00 (2006.01)
H05K 1/14 (2006.01)

(52) U.S. Cl.
USPC ........... 235/488; 235/379; 235/380; 235/449; 235/487; 235/492; 235/493; 361/737

(58) Field of Classification Search
USPC ............. 235/379, 380, 449, 488, 487, 492, 235/493; 705/41; 361/737
See application file for complete search history.

(56) References Cited

U.S. PATENT DOCUMENTS

| | | | |
|---|---|---|---|
| 3,838,252 A * | 9/1974 | Hynes et al. | 360/131 |
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A * | 12/1988 | Burkhardt | 235/438 |
| 4,797,542 A | 1/1989 | Hara | |
| 4,868,376 A * | 9/1989 | Lessin et al. | 235/492 |
| 4,977,040 A * | 12/1990 | Yano et al. | 428/839.1 |
| 5,038,251 A | 8/1991 | Sugiyama et al. | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

Primary Examiner — Daniel Walsh (57) ABSTRACT

A card may include a magnetic stripe emulator having a coil with magnetic or non-magnetic material located inside and/or outside of the coil. A shield may be located adjacent to the magnetic emulator that may include a magnetic or a non-magnetic material. The shield may attract magnetic flux lines generated by the magnetic stripe emulator to reduce a magnitude of an electromagnetic field generated on one side of the card as compared to a magnitude of an electromagnetic field generated on another side of the card. A shield may be laminated between layers of a card or may be fixed on a surface of a card.

31 Claims, 6 Drawing Sheets

U.S. PATENT DOCUMENTS

| | | | |
|---|---|---|---|
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A * | 4/1997 | Lane | 382/124 |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,955,961 A * | 9/1999 | Wallerstein | 340/5.4 |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A * | 8/2000 | Grant et al. | 235/449 |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,845,863 B1 * | 1/2005 | Riley | 206/39 |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparinl et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,375,631 B2 * | 5/2008 | Moskowitz et al. | 340/572.1 |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 * | 9/2009 | Osterweil et al. | 235/449 |
| 7,591,427 B2 | 9/2009 | Osterweil | |
| 7,602,904 B2 | 10/2009 | Juels et al. | |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,828,207 B2 | 11/2010 | Cooper | |
| 8,061,593 B1 * | 11/2011 | Graef et al. | 235/379 |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 * | 8/2002 | Keresman et al. | 705/65 |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0069846 A1 * | 4/2003 | Marcon | 705/41 |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 * | 12/2003 | Finkelstein | 235/492 |
| 2004/0035942 A1 * | 2/2004 | Silverman | 235/493 |
| 2004/0054574 A1 | 3/2004 | Kaufman et al. | |
| 2004/0133787 A1 | 7/2004 | Doughty | |
| 2004/0162732 A1 | 8/2004 | Rahim et al. | |

| | | | | | | |
|---|---|---|---|---|---|---|
| 2004/0172535 | A1 | 9/2004 | Jakobsson | 2008/0128515 A1 | 6/2008 | Di Iorio |
| 2004/0177045 | A1 | 9/2004 | Brown | 2008/0148394 A1 | 6/2008 | Poidomani et al. |
| 2004/0251303 | A1* | 12/2004 | Cooper .................. 235/380 | 2008/0201264 A1 | 8/2008 | Brown et al. |
| 2005/0039027 | A1* | 2/2005 | Shapiro .................. 713/186 | 2008/0209550 A1 | 8/2008 | Di Iorio |
| 2005/0043997 | A1 | 2/2005 | Sahota et al. | 2008/0288699 A1 | 11/2008 | Chichierchia |
| 2005/0080747 | A1 | 4/2005 | Anderson et al. | 2008/0294930 A1 | 11/2008 | Varone et al. |
| 2005/0086160 | A1 | 4/2005 | Wong et al. | 2008/0302877 A1 | 12/2008 | Musella et al. |
| 2005/0086177 | A1 | 4/2005 | Anderson et al. | 2009/0013122 A1 | 1/2009 | Sepe et al. |
| 2005/0116026 | A1 | 6/2005 | Burger et al. | 2009/0036147 A1 | 2/2009 | Romano |
| 2005/0119940 | A1 | 6/2005 | Concilio et al. | 2009/0046522 A1 | 2/2009 | Sepe et al. |
| 2005/0154643 | A1 | 7/2005 | Doan et al. | 2009/0108064 A1 | 4/2009 | Fernandes et al. |
| 2005/0194452 | A1* | 9/2005 | Nordentoft et al. .......... 235/492 | 2009/0134218 A1* | 5/2009 | Yuzon et al. ............. 235/382 |
| 2005/0228959 | A1 | 10/2005 | D'Albore et al. | 2009/0150295 A1 | 6/2009 | Hatch et al. |
| 2006/0000900 | A1 | 1/2006 | Fernandes et al. | 2009/0152365 A1* | 6/2009 | Li et al. ................... 235/493 |
| 2006/0017570 | A1* | 1/2006 | Moskowitz et al. ....... 340/572.7 | 2009/0159700 A1 | 6/2009 | Mullen |
| 2006/0037073 | A1 | 2/2006 | Juels et al. | 2009/0159708 A1* | 6/2009 | Mullen et al. ............. 235/493 |
| 2006/0041759 | A1 | 2/2006 | Kaliski et al. | 2009/0166435 A1* | 7/2009 | Blythe ...................... 235/493 |
| 2006/0085328 | A1 | 4/2006 | Cohen et al. | 2009/0200385 A1* | 8/2009 | Hachey et al. ............. 235/494 |
| 2006/0091223 | A1* | 5/2006 | Zellner et al. ............. 235/492 | 2009/0242648 A1 | 10/2009 | Di Sirio et al. |
| 2006/0161435 | A1 | 7/2006 | Atef et al. | 2009/0244858 A1 | 10/2009 | Di Sirio et al. |
| 2006/0163353 | A1 | 7/2006 | Moulette et al. | 2009/0253460 A1 | 10/2009 | Varone et al. |
| 2006/0174104 | A1 | 8/2006 | Crichton et al. | 2009/0255996 A1 | 10/2009 | Brown et al. |
| 2006/0196931 | A1 | 9/2006 | Holtmanns et al. | 2009/0290704 A1 | 11/2009 | Cimino |
| 2006/0227523 | A1* | 10/2006 | Pennaz et al. ............. 361/783 | 2009/0303885 A1 | 12/2009 | Longo |
| 2006/0256961 | A1 | 11/2006 | Brainard et al. | 2010/0127830 A1* | 5/2010 | Nielsen et al. ............. 340/10.1 |
| 2006/0283958 | A1* | 12/2006 | Osterweil ................. 235/492 | 2010/0264227 A1* | 10/2010 | Joyce ........................ 235/493 |
| 2007/0034700 | A1* | 2/2007 | Poidomani et al. .......... 235/492 | 2011/0028184 A1 | 2/2011 | Cooper |
| 2007/0114274 | A1 | 5/2007 | Gibbs et al. | 2011/0042133 A1* | 2/2011 | Lythcott .................... 174/377 |
| 2007/0124321 | A1 | 5/2007 | Szydlo | 2011/0174874 A1* | 7/2011 | Poznansky et al. ......... 235/379 |
| 2007/0152070 | A1 | 7/2007 | D'Albore | 2013/0099005 A1* | 4/2013 | Baran ........................ 235/492 |
| 2007/0152072 | A1 | 7/2007 | Frallicciardi et al. | | | |
| 2007/0153487 | A1 | 7/2007 | Frallicciardi et al. | | | |
| 2007/0174614 | A1 | 7/2007 | Duane et al. | | | |
| 2007/0192249 | A1 | 8/2007 | Biffle et al. | | | |
| 2007/0241183 | A1 | 10/2007 | Brown et al. | | | |
| 2007/0241201 | A1 | 10/2007 | Brown et al. | | | |
| 2007/0256123 | A1 | 11/2007 | Duane et al. | | | |
| 2007/0291753 | A1 | 12/2007 | Romano | | | |
| 2008/0005510 | A1 | 1/2008 | Sepe et al. | | | |
| 2008/0008315 | A1 | 1/2008 | Fontana et al. | | | |
| 2008/0008322 | A1 | 1/2008 | Fontana et al. | | | |
| 2008/0010675 | A1 | 1/2008 | Massascusa et al. | | | |
| 2008/0016351 | A1 | 1/2008 | Fontana et al. | | | |
| 2008/0019507 | A1 | 1/2008 | Fontana et al. | | | |
| 2008/0028447 | A1 | 1/2008 | O'Malley et al. | | | |
| 2008/0040271 | A1 | 2/2008 | Hammad et al. | | | |
| 2008/0040276 | A1 | 2/2008 | Hammad et al. | | | |
| 2008/0058016 | A1 | 3/2008 | Di Maggio et al. | | | |
| 2008/0059379 | A1 | 3/2008 | Ramaci et al. | | | |
| 2008/0096326 | A1 | 4/2008 | Reed | | | |
| 2008/0126398 | A1 | 5/2008 | Cimino | | | |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

SHIELDED MAGNETIC STRIPE FOR MAGNETIC CARDS AND DEVICES

CROSS-REFERENCE TO RELATED APPLICATION

This application claims the benefit of U.S. Provisional Patent Application No. 61/468,311, titled "SHIELDED MAGNETIC STRIPE FOR MAGNETIC CARDS AND DEVICES," filed Mar. 28, 2011, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, and a dynamic magnetic stripe communications device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a payment option. The code may be received by the card via manual input (e.g., onto buttons of the card).

A magnetic emulator may include a coil. Inside the coil, one or more strips of a material (e.g., a magnetic or non-magnetic material) may be provided. Outside of the coil, one or more strips of a material (e.g., a magnetic or non-magnetic material) may be provided. For example, three strips of soft magnetic material may be provided in a coil and one strip of hard magnetic material may be provided exterior of the coil on the side of the coil opposite of the side of the coil utilized to serially communicate magnetic stripe data to a magnetic stripe reader.

A magnetic emulator may include a coil that may produce an electromagnetic field when current is conducted through the coil. A magnetic material (e.g., a soft-magnetic material) may be located within the coil, which may enhance the electromagnetic field produced by the coil. For example, multiple or several strips of soft-magnetic material may be provided inside of the coil. A hard-magnetic material may be provided outside of the coil. The hard-magnetic material may be provided on the side of the coil opposite the side of a coil that communicates to a read-head of a magnetic stripe reader. For example, the electromagnetic field produced by the coil may be subjected to a torque that may be induced by the magnetic field generated by the hard-magnetic material outside of the coil. Such a torque may orient a magnetic moment of the electromagnetic field to the magnetic field generated by the hard-magnetic material.

One or more strips of shielding material may be placed adjacent to the magnetic emulator. For example, one or more strips of shielding material may be provided adjacent to the magnetic emulator on a side opposite a side that communicates data to a read-head of a magnetic stripe reader. In so doing, the shielding material may reduce a magnetic bias from a hard magnetic material located outside of a coil of a magnetic emulator, as well as reduce an electromagnetic field that may be produced by a coil of a magnetic emulator. In doing so, magnetic-based signals from a magnetic emulator may be substantially attenuated on an adjacent side of the magnetic emulator.

Accordingly, for example, a magnetic stripe reader that provides one read-head housing on one side of a card and another read-head housing on a different side of a card may receive discernable magnetic-based signals from the read-head housing on the side of the magnetic emulator that does not include a shield and may not receive discernable magnetic-based signals from the read-head housing on the side of the magnetic emulator that does include a shield.

A shielding material may, for example, be a magnetic or non-magnetic material. A shielding material may be a permalloy or mu-metal. A shielding material may substantially reduce, for example, just a magnetic bias from a hard magnetic material from a magnetic emulator. A shielding material may substantially reduce, for example, both a magnetic bias from a hard magnetic material from a magnetic emulator as well as electromagnetic information signals from a coil of a magnetic emulator.

Accordingly, a magnitude of a magnetic field produced by the magnetic emulator and/or the hard magnetic material may be higher on one side of the shield as compared to the opposite side of the shield.

In addition, the shielding material may channel, or redirect, the magnetic field produced by the magnetic emulator. In so doing, not only may the shield reduce the magnitude of a magnetic field produced by the magnetic emulator on one side of the shield, the shield may also serve to increase the magnitude of the magnetic field on the other side of the shield.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
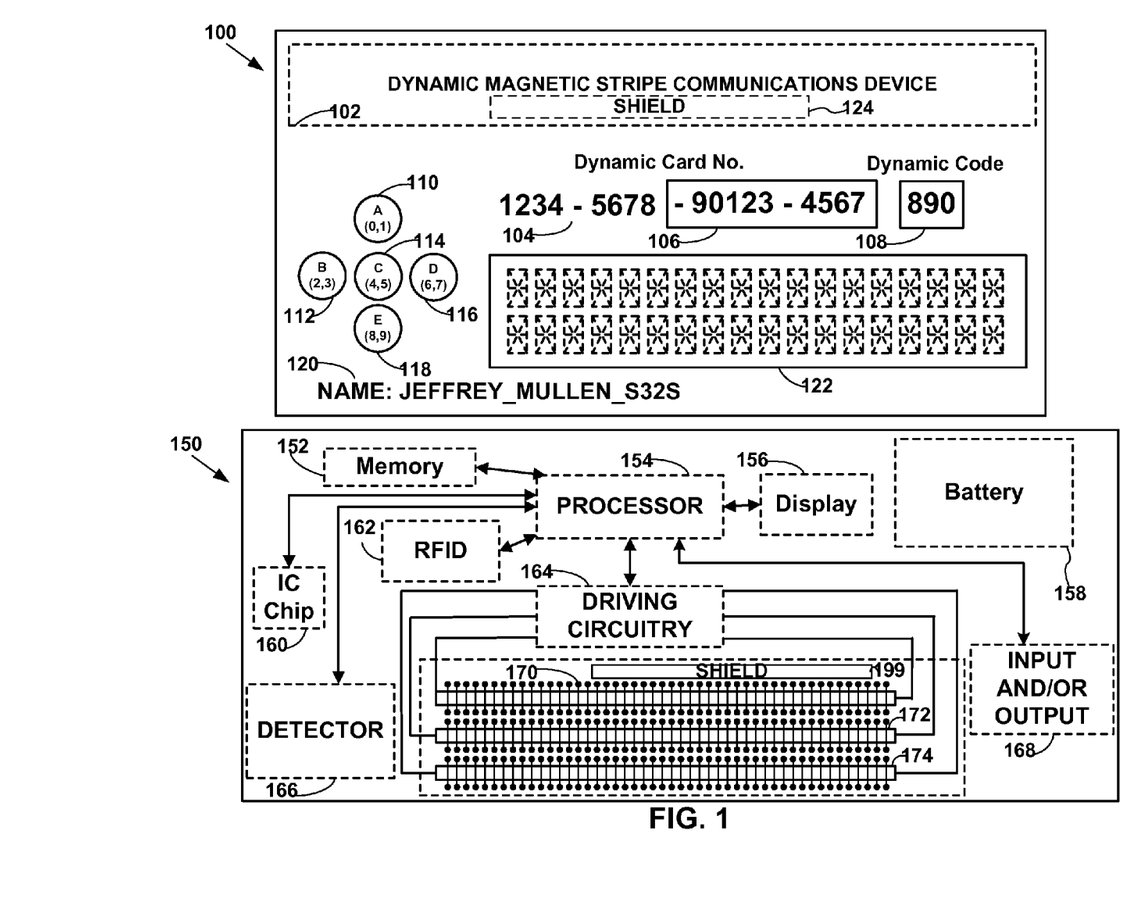
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may be determined and processed by a processor of card 100 as data input.

Dynamic magnetic stripe communications device 102 may be included on card 100 to communicate information to, for example, a read-head of a magnetic stripe reader via, for example, electromagnetic signals. The electromagnetic field strength as may be measured on one side of card 100, for example, may be reduced by shield 124. In so doing, for example, the presence of shield 124 in proximity to dynamic magnetic stripe communications device 102 may cause the electromagnetic field produced by dynamic magnetic stripe communications device 102 to be reduced on, for example, one side of card 100 as compared, for example, to the other side of card 100. The presence of shield 124 in proximity to dynamic magnetic stripe communications device 102 may, for example, cause a magnetic field produced by a hard-magnetic material of dynamic magnetic stripe communications device 102 to be reduced on, for example, one side of card 100 as compared, for example, to another side of card 100.

The electromagnetic field strength as may be measured on one side of card 100 may be increased by shield 124. For example, a presence of shield 124 in proximity to dynamic magnetic stripe communications device 102 may channel, or redirect, electromagnetic flux lines generated by dynamic magnetic stripe communications device 102 away from shield 124.

Card 100 may, for example, be formed as a laminate structure of two or more layers. Card 100 may, for example, include top and bottom layers of a plastic material (e.g., a polymer). Electronics package circuitry (e.g., one or more printed circuit boards, a dynamic magnetic stripe communications device, a battery, a display, a processor, and buttons) may be sandwiched between top and bottom layers of a laminate structure of card 100. A material (e.g., a polyurethane-based or silicon-based substance) may be injected between top and bottom layers and cured (e.g., solidified) to form card 100 that has a flexible laminate structure.

FIG. 1 shows architecture 150, which may include, for example, one or more processors 154. One or more processors 154 may be configured to utilize external memory 152, internal memory within processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may, for example, be touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented within architecture 150. For example, integrated circuit (IC) chip 160 (e.g., an EMV chip) may be included on architecture 150, that can communicate information with a chip reader (e.g., an EMV chip reader). Radio frequency identification (RFID) module 162 may be included within architecture 150 to enable the exchange of information between an RFID reader and architecture 150.

Other input and/or output devices 168 may be included within architecture 150, for example, to provide any number of input and/or output capabilities. For example, other input and/or output devices 168 may include an audio device capable of receiving and/or transmitting audible information. Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material). A shield may be provided, for example, to prevent magnetic bias, or other magnetic-based signals, from proceeding past shield 199. In this manner, for example, shield 199 may be placed on the obverse side of a dynamic magnetic stripe communications device and may block magnetic-based fields from emanating past shield 199 and as such, prevent fields from emanating through the front of a card (e.g., card 100 of FIG. 1). In doing so, magnetic-based fields may be provided by a dynamic magnetic stripe communications device through the reverse side of a card (e.g., card 100 of FIG. 1).

Shield 199 may include magnetic or non-magnetic material (e.g., soft-magnetic material). Shield 199 may include one or more layers of material (e.g., one or more layers of soft-magnetic material). Shield 199 may limit the electromagnetic field strength as may be generated, for example, by electromagnetic field generators 170-174 on one side of shield 199 as compared to the other side of shield 199.

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented on architecture 150 may be determined by processor 154. One or more detectors 166 may be utilized, for example, to sense the proximity, mechanical distortion, or actual contact, of an external device, which in turn, may trigger the initiation of a communication sequence. The sensed presence or touch of the external device may then be communicated to a controller (e.g., processor 154), which in turn may direct the exchange of information between architecture 150 and the external device. The sensed presence, mechanical distortion, or touch of the external device may be effective to, for example, determine the type of device or object detected.

The detection may include, for example, a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power to a card for a number of years (e.g., approximately 2-4 years). One or more batteries 158 may be included, for example, as rechargeable batteries.

Figure 2:
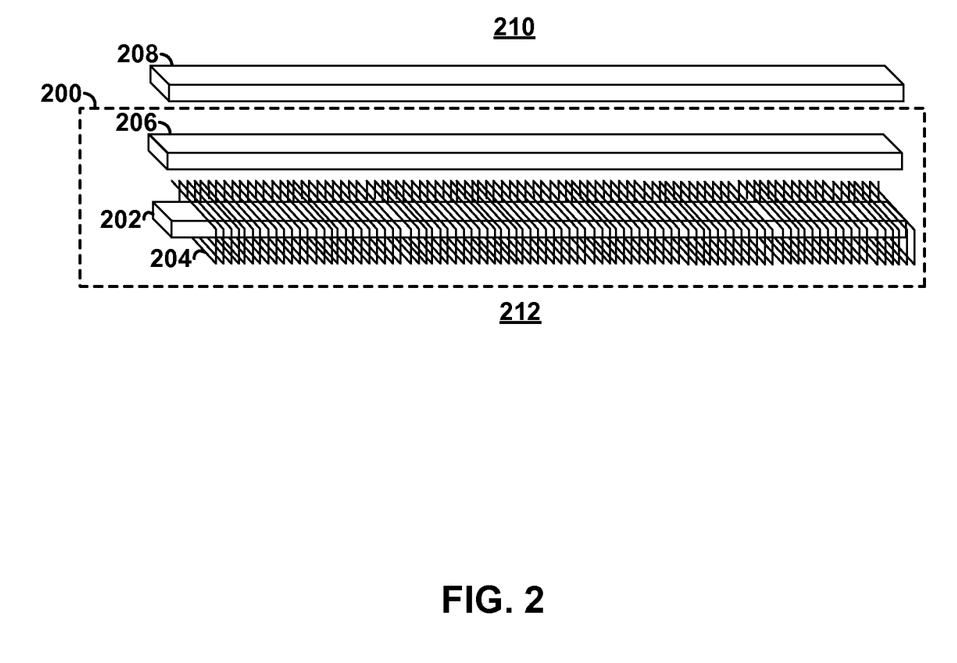
FIG. 2 is an illustration of a magnetic emulator and a shield constructed in accordance with the principles of the present invention.

FIG. 2 shows magnetic emulator 200 and shield 208. Coil 204 may include a conductive winding (e.g., a copper winding) that may surround material 202 along a length of material 202. Material 202 may include a magnetic or a non-magnetic material (e.g., a soft-magnetic material). Material 202 may include a lamination of two or more layers of soft-magnetic material. For example, a laminated build-up of multiple layers of soft-magnetic material may enhance magnetic properties of material 202 (e.g., the coercivity of material 202 may be increased).

Magnetic emulator 200 may include material 206. For example, material 206 may be arranged in proximity to coil 204 and material 202, such that material 206 may extend along at least a portion of a length of coil 204 and material 202. Material 206 may include a magnetic or a non-magnetic material (e.g., a hard-magnetic material). Material 206 may include, for example, a laminated structure having two or more layers of material (e.g., two or more layers of hard-magnetic material).

As current is conducted by coil 204 (e.g., via driving circuitry not shown), an electromagnetic field may be produced by magnetic emulator 200. A direction of current conducted through coil 204 may determine a polarity of the electromagnetic field generated. For example, current conducted through coil 204 may produce electromagnetic flux lines in accordance with an electromagnetic field having one polarity, while reversing the current conducted by coil 204 may produce electromagnetic flux lines in accordance with a reversed electromagnetic field polarity. In so doing, one track of electromagnetic data may be communicated by magnetic emulator 200 to read-heads of a magnetic stripe reader by appropriate control of current conducted by coil 204.

Material 206 (e.g., hard-magnetic material) may bias the electromagnetic field generated by magnetic emulator 200. For example, a magnetization curve associated with material 202 (e.g., a soft-magnetic material) may be biased (e.g., exchange biased) by the presence of material 206 (e.g., a hard-magnetic material), such that the hard-magnetization behavior of material 206 may cause a shift in the soft-magnetization curve of material 202.

Shield 208 (e.g., a soft-magnetic material) may be placed in proximity to magnetic emulator 200 (e.g., in proximity to material 206). In so doing, for example, shield 208 may reduce a magnitude of an electromagnetic field produced by magnetic emulator 200 in one region (e.g., region 210) as compared to a magnitude of an electromagnetic field produced in another region (e.g., region 212). Additionally, for example, shield 208 may interact with magnetic emulator 200 to enhance a magnitude of an electromagnetic field generated by magnetic emulator 200 in one region (e.g., region 212) as compared to a magnitude of an electromagnetic field produced in another region (e.g., region 210).

Figure 3:
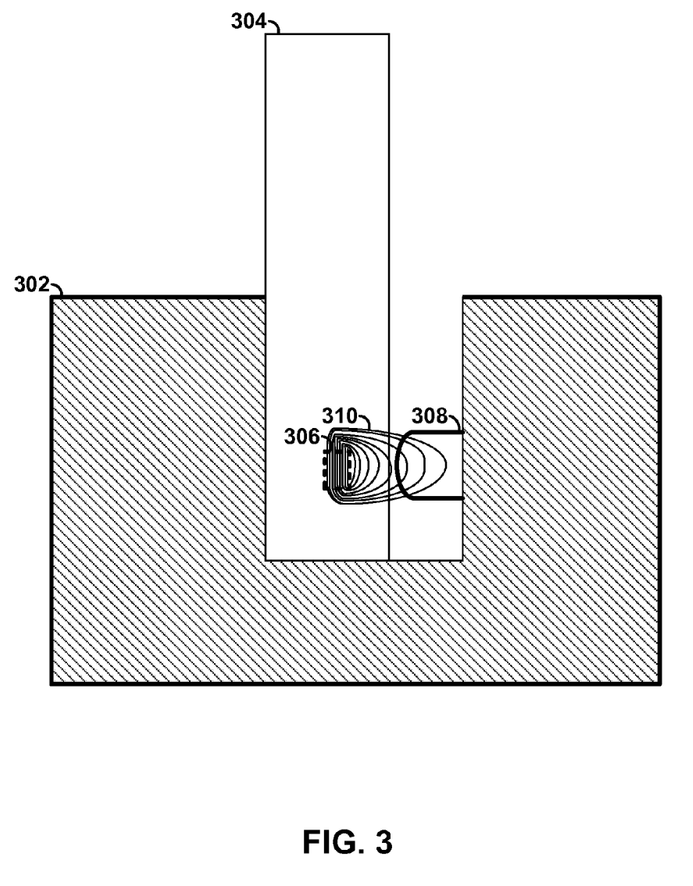
FIG. 3 is an illustration of a magnetic interaction system constructed in accordance with the principles of the present invention.

FIG. 3 shows magnetic interaction system 300. System 300 may include magnetic card reader 302, magnetic read head 308, and card 304. Card 304 may include magnetic stripe emulator 306 capable of generating electromagnetic flux lines 310.

Interaction between magnetic read head 308 and magnetic stripe emulator 306 may increase a magnitude of electromagnetic flux lines 310 as may be generated by magnetic stripe emulator 306. For example, magnetic stripe emulator 306 may generate magnetic flux lines 310 that, for example, due to the presence of magnetic read head 308 may protrude outwardly towards magnetic read head 308. In so doing, the presence of magnetic read head 308 may provide an increased attraction of magnetic flux lines 310 to magnetic read head 308. Accordingly, for example, detection of magnetic flux lines 310 by magnetic read head 308 may be improved via an attractive interaction between magnetic read head 308 and magnetic stripe emulator 306.

Magnetic stripe emulator 306 may, for example, include a coil and associated driving circuitry, such that the driving circuitry may cause a current to be conducted by the coil to produce electromagnetic flux lines 310. Magnetic stripe emulator 306 may further include, for example, a non-magnetic material and/or a magnetic material (e.g., a soft-magnetic material) contained within the coil. A non-magnetic and/or a magnetic material (e.g., a hard-magnetic material) may be placed outside of the coil. A presence, for example, of the hard-magnetic material outside of the coil may interact with the soft-magnetic material inside of the coil to further enhance an electromagnetic field produced by the coil.

By modulating a direction and/or a magnitude of current flow through the coil, a responsive polarity shift and/or magnitude shift of electromagnetic flux lines 310 may be induced. A series of polarity and/or magnitude shifts in electromagnetic flux lines 310 may be detected by magnetic read head 308 as data communicated from card 304 to read head 308 of magnetic card reader 302. In so doing, transfer of data from card 304 to magnetic card reader 302 may be enhanced through the increased attraction between magnetic read head 308 and the magnetic flux lines 310 as generated by magnetic stripe emulator 306.

Figure 4:
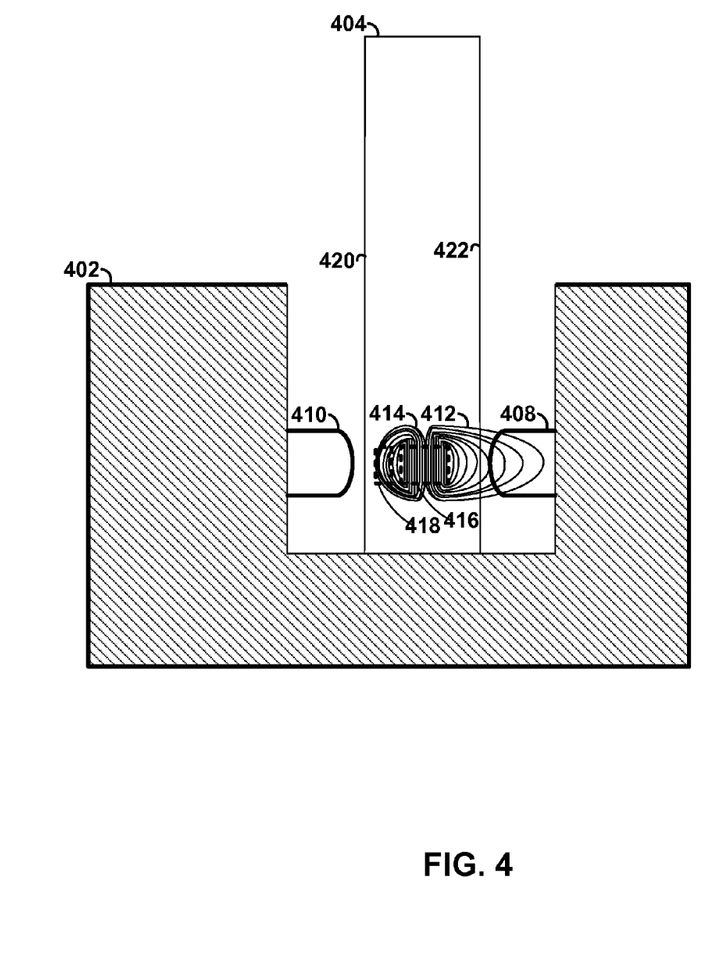
FIG. 4 is an illustration of a magnetic interaction system constructed in accordance with the principles of the present invention.

FIG. 4 shows magnetic interaction system 400. System 400 may include magnetic card reader 402, magnetic read heads 408 and 410, and card 404. Card 404 may include magnetic stripe emulator 416 capable of generating electromagnetic flux lines 412 and 414.

Magnetic card reader 402 may, for example, include a magnetic read head (e.g., magnetic read head 408) on one side of magnetic card reader 402 and may, for example, include another magnetic read head (e.g., magnetic read head 410) on an opposite side of magnetic card reader 402. In so doing, magnetic card reader 402 may detect an electromagnetic field generated by card 404 regardless of a direction that card 404 may be inserted into magnetic card reader 402.

For example, insertion of card 404 into card reader 402 as illustrated may create a magnetic interaction system between magnetic stripe emulator 416 and magnetic read head 408 while substantially preventing a magnetic interaction between magnetic stripe emulator 416 and magnetic read head 410. Insertion of card 404 into card reader 402 in an opposite orientation may, for example, create a magnetic interaction system between magnetic stripe emulator 416 and magnetic read head 410 while substantially preventing a magnetic interaction between magnetic stripe emulator 416 and magnetic read head 408.

A presence of a magnetic read head (e.g., magnetic read head 408) may provide an attraction to magnetic flux lines (e.g., magnetic flux lines 412) as generated by magnetic stripe emulator 416. A presence of a second magnetic read head (e.g., magnetic read head 410) may provide an attraction to magnetic flux lines (e.g., magnetic flux lines 414) as generated by magnetic stripe emulator 416.

Shield 418 may include a magnetic or non-magnetic material (e.g., a soft-magnetic material). Shield 418 may be placed in proximity to magnetic stripe emulator 416 to, for example, reduce a magnetic attraction between magnetic flux lines generated by magnetic stripe emulator 416 and either magnetic read head 410 or magnetic read head 408. Multiple layers of a magnetic or non-magnetic material (e.g., multiple layers of a soft-magnetic material) may be laminated together to form shield 418. In so doing, for example, a coercivity of shield 418 may be enhanced (e.g., increased).

A presence, for example, of shield 418 between magnetic stripe emulator 416 and magnetic read head 410 may reduce a magnitude of an electromagnetic field that may be detected by magnetic read head 410. Shield 418 may, for example, attract, or channel, magnetic flux lines 414 so as to substantially prevent magnetic flux lines 414 from being detected by magnetic read head 410. Accordingly, for example, a magnitude of electromagnetic flux as detected, for example, on side 420 of card 404 may be reduced as compared to a magnitude of electromagnetic flux as detected, for example, on side 422 of card 404.

Additionally, a magnitude of electromagnetic flux as detected, for example, on side 422 of card 404 may be increased as compared to a magnitude of electromagnetic flux as detected on side 420 of card 404. For example, shield 418 may redirect electromagnetic flux toward side 422 of card 404, so as to increase a magnitude of electromagnetic flux on side 422 as compared to a magnitude of electromagnetic flux that may be detected on side 422 of card 404 in the absence of shield 418.

Persons skilled in the art will appreciate that reversal of card 404 within magnetic card reader 402 may cause a reversal of magnetic interaction between card 404 and magnetic card reader 402. For example, card 404 may be inserted into magnetic card reader 402 such that shield 418 exists between magnetic stripe emulator 416 and magnetic read head 408. In such an instance, a magnitude of an electromagnetic field that may be detected by magnetic read head 408 may be reduced. In so doing, shield 418 may, for example, attract, or channel, magnetic flux lines so as to substantially prevent magnetic flux lines from being detected by magnetic read head 408. Additionally, the attraction, or channeling, of magnetic flux lines by shield 418 may enhance an ability of magnetic read head 410 of detecting magnetic flux lines as generated by magnetic stripe emulator 416.

Figure 5:
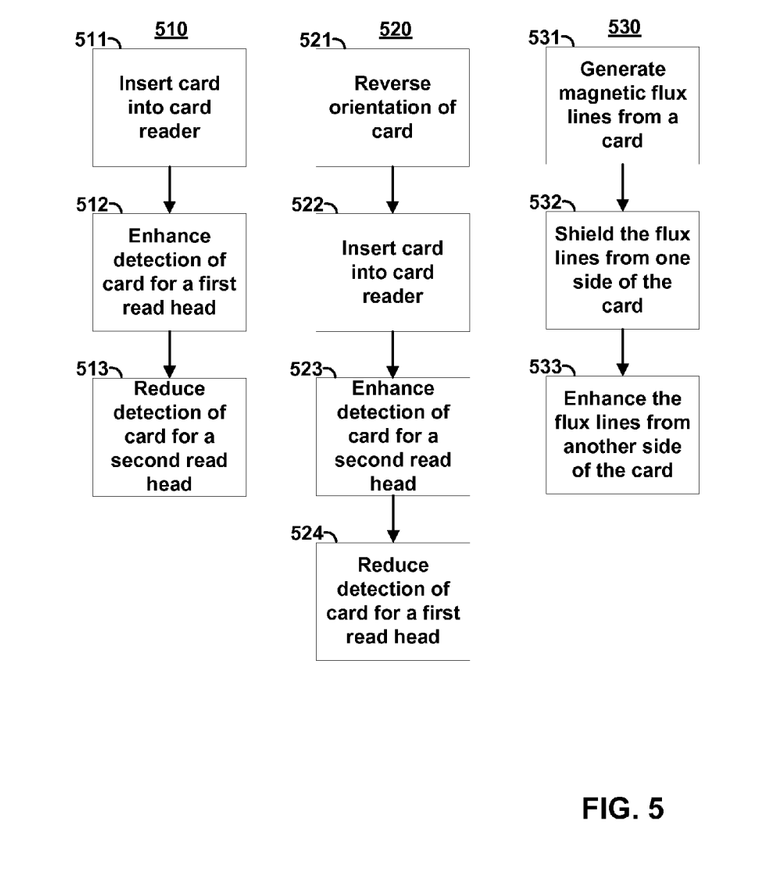
FIG. 5 is a flow chart of processes constructed in accordance with the principles of the present invention.

FIG. 5 shows flow charts 510 through 530. Sequence 510 may include, for example, inserting a card into a magnetic card reader (e.g., a dual-head magnetic card reader) as in step 511. Depending upon an orientation of the card, detection of an electromagnetic field generated by the card may be enhanced for a first read head of a magnetic card reader (e.g., as in step 512). For example, a shield and a magnetic stripe emulator on the card may be oriented such that the shield may channel, or redirect, magnetic flux lines generated by the magnetic stripe emulator to the magnetic read head. Additionally, detection of the electromagnetic field generated by the card may be reduced for a second read head of the magnetic card reader (e.g., as in step 513). For example, a shield and a magnetic stripe emulator on the card may be oriented such that the shield may attract magnetic flux lines generated by the magnetic stripe emulator, thereby reducing a magnitude of magnetic flux detected by the second read head of the magnetic card reader.

Sequence 520 may include, for example, reversing an orientation of the card (e.g., as in step 521) and reinserting a card into the magnetic card reader as in step 522. Detection of an electromagnetic field generated by the card may be enhanced for the second read head of the magnetic card reader (e.g., as in step 523). For example, a shield and a magnetic stripe emulator on the card may be reoriented such that the shield may channel, or redirect, magnetic flux lines generated by the magnetic stripe emulator to the second magnetic read head. Additionally, detection of the electromagnetic field generated by the card may be reduced for the first read head of the magnetic card reader (e.g., as in step 524). For example, a shield and a magnetic stripe emulator on the card may be reoriented such that the shield may attract magnetic flux lines generated by the magnetic stripe emulator, thereby reducing a magnitude of magnetic flux detected by the first read head of the magnetic card reader.

Sequence 530 may include, for example, generating magnetic flux lines from a magnetic stripe emulator of a card (e.g., as in step 531). A shield may be used to reduce a magnitude of magnetic flux lines generated by the card on one side of the card (e.g., as in step 532). Additionally, the shield may be used, for example, to increase a magnitude of magnetic flux lines generated by the card on another side of the card (e.g., as in step 533).

Figure 6:
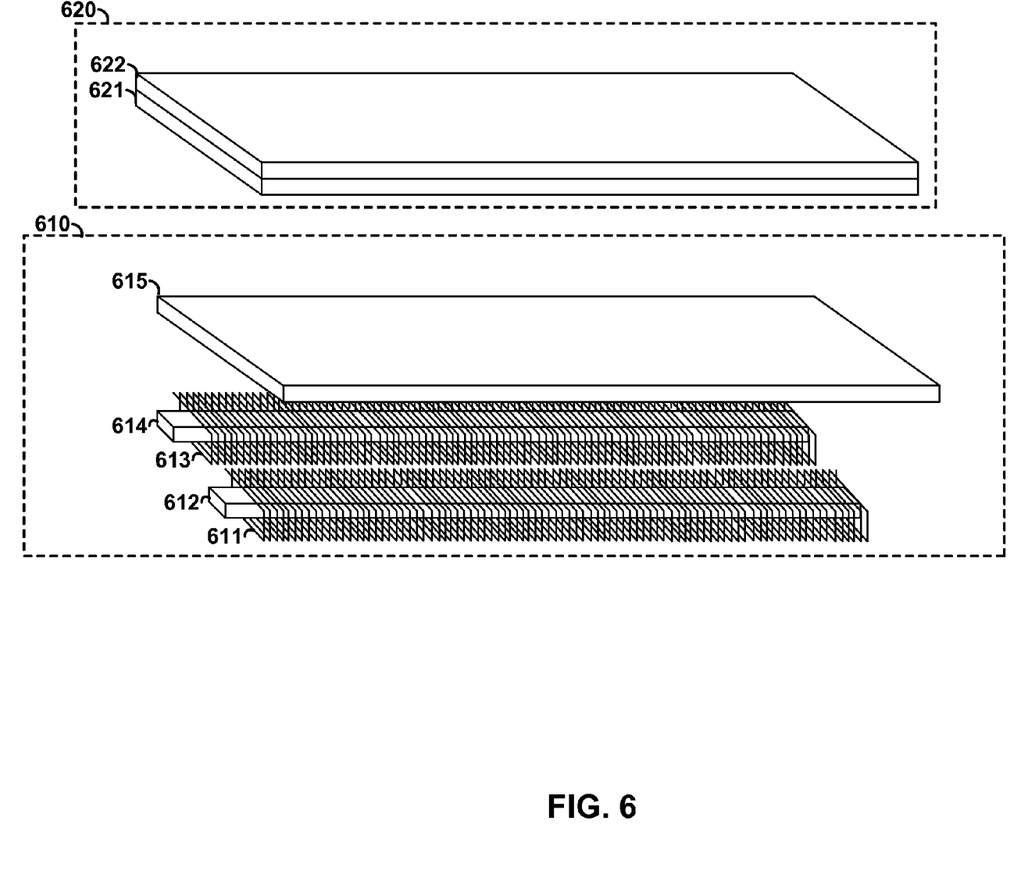
FIG. 6 is an illustration of a magnetic emulator and a shield constructed in accordance with the principles of the present invention.

FIG. 6 shows magnetic emulator 610 and shield 620. Magnetic emulator 610 may include, for example, two coils 611 and 613 that may each include a conductive winding (e.g., a copper winding) that may surround material 612 and 614, respectively, along at least a portion of respective lengths of materials 612 and 614. Materials 612 and 614 may include, for example, soft-magnetic materials. Two tracks of electromagnetic data may, for example, be communicated by magnetic emulator 610 to read-heads of a magnetic stripe reader by appropriate control of current conducted by coils 611 and 613.

Magnetic emulator 610 may include magnet 615. For example, magnet 615 may be arranged in proximity to coils 611 and 613, such that magnet 615 may extend along at least a portion of a length of coils 611 and 613. Magnet 615 may, for example, include a hard-magnetic material.

Shield 620 may include, for example, two shields (e.g., shields 621 and 622) that may be fixed together (e.g., laminated together) and placed in proximity to magnetic emulator 610. Shields 621 and 622 may include, for example, soft-magnetic materials. A sheath may be placed around shield 621 and/or shield 622. A sheath may be placed around shields 621 and 622 and the sheath may be attached to magnet 615. A sheath may be attached to magnet 615 (e.g., fixed at points in the middle, at the ends, or in the middle and at the ends of magnet 615). A sheath may be attached uniformly across magnet 615. Shields 621 and 622 may not be attached to the sheath. In so doing, for example, shields 621 and 622 may move within the sheath.

Magnetic emulator 610 may, for example, be sandwiched between top and bottom layers of polymer (e.g., PVC). Shield 620 may be fixed (e.g., glued) to one of the layers of polymer (e.g., a top layer). In so doing, for example, laminate may exist between shield 620 and magnet 615.

Shield 620 may be attached to magnetic emulator 610 to form an electronic package that may be held together with other electronic packages via a mold while a liquid laminate material (e.g., a polyurethane-based or silicon-based substance) is injected into the mold. A sheath surrounding shield 620 may, for example, be sealed to prevent liquid laminate from getting into the sheath. The liquid laminate material may be cured (e.g., solidified) via a reaction caused by a change in condition (e.g., chemical, temperature, or UV light). The resulting interior laminate may be sandwiched between two layers of polymer to form a card having a laminate structure with top, middle, and bottom layers.

A card may be formed with a magnetic emulator that does not have a shield. Accordingly, for example, a shield may be fixed (e.g., glued) to a surface of a card (e.g., a top surface) at any location on the card (e.g., at a location above a magnet of a magnetic emulator of the card). A printing technique may be used to cover the shield. For example, colored plastic may be printed onto a shield that later hardens due to some condition (e.g., a particular spectrum of light or temperature).

Persons skilled in the art will also appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. A card comprising:
   a magnetic stripe emulator;
   a shield, wherein a magnitude of an electromagnetic signal generated by said magnetic stripe emulator is reduced by said shield on a first side of said card as compared to a magnitude of said electromagnetic signal on a second side of said card; and
   a magnetic material arranged proximate to said magnetic stripe emulator, wherein said magnetic material is arranged between said magnetic stripe emulator and said shield.

2. The card of claim 1, wherein said magnetic stripe emulator and said shield are sandwiched between top and bottom layers of said card.

3. The card of claim 1, wherein said magnetic stripe emulator is sandwiched between top and bottom layers of said card and said shield is fixed to said top layer of said card.

4. The card of claim 1, wherein said magnetic stripe emulator includes a conductive winding.

5. The card of claim 1, wherein said magnetic stripe emulator includes a conductive winding wrapped around a soft-magnetic material.

6. The card of claim 1, wherein said magnetic stripe emulator includes a conductive winding wrapped around a soft-magnetic material, wherein said soft-magnetic material includes a lamination of at least two layers of soft-magnetic material.

7. The card of claim 1, wherein said magnetic stripe emulator includes a conductive winding wrapped around a soft-magnetic material, wherein said soft-magnetic material includes a lamination of two layers of soft-magnetic material.

8. The card of claim 1, further comprising a second magnetic stripe emulator, wherein said magnetic stripe emulator and said second magnetic stripe emulator include a conductive winding.

9. The card of claim 1, further comprising a second magnetic stripe emulator, wherein said magnetic stripe emulator and said second magnetic stripe emulator include a conductive winding wrapped around a soft-magnetic material.

10. The card of claim 1, further comprising a second magnetic stripe emulator, wherein said magnetic stripe emulator and said second magnetic stripe emulator include a conductive winding wrapped around a soft-magnetic material, wherein said soft-magnetic material includes a lamination of at least two layers of soft-magnetic material.

11. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card; and
a magnetic material arranged proximate to said magnetic stripe emulator, wherein said magnetic material is a hard-magnetic material.

12. The card of claim 11, wherein said magnetic material is a lamination of at least two layers of hard-magnetic material.

13. The card of claim 11, wherein said magnetic stripe emulator includes a coil wrapped around a non-magnetic material.

14. The card of claim 11, wherein said magnetic stripe emulator includes a coil wrapped around a soft-magnetic material.

15. The card of claim 11, wherein said magnetic stripe emulator includes a coil wrapped around a lamination of at least two layers of soft-magnetic material.

16. The card of claim 11, wherein said shield includes a single layer of soft-magnetic material.

17. The card of claim 11, wherein said shield includes a lamination of two layers of soft-magnetic material.

18. The card of claim 11, wherein said shield includes a lamination of two layers of soft-magnetic material wrapped by a sheath, wherein said shield is operable to move within said sheath.

19. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card; and
a magnetic material arranged proximate to said magnetic stripe emulator, wherein said magnetic material includes a lamination of at least two layers of hard-magnetic material.

20. The card of claim 19, wherein said magnetic material is sandwiched between said shield and said magnetic stripe emulator.

21. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card; and
a magnetic material arranged proximate to said magnetic stripe emulator, wherein said magnetic material includes a lamination of two layers of hard-magnetic material.

22. The card of claim 21, wherein said magnetic material extends along at least a portion of a length of said magnetic stripe emulator.

23. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card; and
a magnetic material arranged proximate to said magnetic stripe emulator, wherein said magnetic material is arranged between said magnetic stripe emulator and said shield and wherein said magnetic material is a hard-magnetic material.

24. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card;
a second magnetic stripe emulator; and
a magnetic material arranged proximate to said magnetic stripe emulator and said second magnetic stripe emulator, wherein said magnetic material is a hard-magnetic material.

25. The card of claim 24, wherein said shield is a lamination of two shielding layers.

26. The card of claim 24, wherein said shield is a lamination of two shielding layers wrapped by a sheath, wherein said sheath is attached to said magnetic material.

27. The card of claim 24, wherein said shield is a lamination of two shielding layers wrapped by a sheath, wherein said sheath is not attached to said magnetic material.

28. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card;
a second magnetic stripe emulator; and
a magnetic material arranged proximate to said magnetic stripe emulator and said second magnetic stripe emulator, wherein said magnetic material includes a lamination of at least two layers of hard-magnetic material.

29. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card;
a magnetic material arranged proximate to said magnetic stripe emulator; and
a sheath wrapped around said shield, said sheath being attached to said magnetic material.

30. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card;
a magnetic material arranged proximate to said magnetic stripe emulator; and
a sheath wrapped around said shield, wherein said shield includes a laminate of two layers.

31. A card comprising:
a magnetic stripe emulator;
a shield, wherein a magnitude of an electromagnetic signal generated by said magnetic stripe emulator is reduced by said shield on a first side of said card as compared to a magnitude of said electromagnetic signal on a second side of said card;

a magnetic material arranged proximate to said magnetic stripe emulator; and a sheath wrapped around said shield, wherein said shield includes a laminate of two layers, and wherein said laminated layers are not attached to said sheath.

\* \* \* \* \*